United States Patent
Lan

(10) Patent No.: US 9,778,692 B2
(45) Date of Patent: Oct. 3, 2017

(54) DOCKING STATION

(71) Applicant: Wistron Corp., New Taipei (TW)

(72) Inventor: Chang-Feng Lan, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 14/862,077

(22) Filed: Sep. 22, 2015

(65) Prior Publication Data

US 2016/0282903 A1    Sep. 29, 2016

(30) Foreign Application Priority Data

Mar. 25, 2015    (TW) .............................. 104109492 A

(51) Int. Cl.
*H05K 7/00* (2006.01)
*G06F 1/16* (2006.01)

(52) U.S. Cl.
CPC .................................. *G06F 1/1632* (2013.01)

(58) Field of Classification Search
CPC .................................................. G06K 7/10891
USPC ..................................................... 361/679.01
See application file for complete search history.

(56) References Cited

U.S. PATENT DOCUMENTS

| | | | | |
|---|---|---|---|---|
| 5,661,634 A * | 8/1997 | Obata | ................... | G06F 1/1626 361/679.02 |
| 7,405,929 B1 * | 7/2008 | Chuang | ................. | G06F 1/1632 361/679.41 |
| 2008/0153359 A1 * | 6/2008 | Ma | ..................... | H01R 12/7005 439/658 |
| 2010/0170952 A1 * | 7/2010 | Mangaroo | .......... | G06K 7/10881 235/462.45 |
| 2013/0034403 A1 * | 2/2013 | Lan | ..................... | F16B 43/001 411/371.1 |

FOREIGN PATENT DOCUMENTS

| TW | I220359 B | 8/2004 |
|---|---|---|
| TW | M346047 | 12/2008 |
| TW | 201237601 A1 | 9/2012 |
| TW | 201351796 A | 12/2013 |
| TW | M496259 U | 2/2015 |

OTHER PUBLICATIONS

Taiwan Patent Office, Office Action, Patent Application Serial No. 104109492, Jan. 28, 2016, Taiwan.

* cited by examiner

*Primary Examiner* — Jerry Wu

(57) ABSTRACT

A docking station suitable for connecting to a portable electronic device is provided. The docking station includes a main body, a connector, a cover, and an elastic sealing member. The connector is movably disposed in the main body for connecting the portable electronic device. The cover is detachably connected to the main body and has an opening for exposing the connector. The elastic sealing member is fit on the connector and abuts a side wall of the opening for preventing water from entering the main body.

8 Claims, 9 Drawing Sheets

DOCKING STATION

CROSS REFERENCE TO RELATED APPLICATIONS

The present application claims priority of Taiwan Patent Application No. 104109492, filed on Mar. 25, 2015, the entirety of which is incorporated by reference herein.

BACKGROUND OF THE INVENTION

Field of the Invention

The present application relates to a docking station, and in particular to a docking station for a portable electronic device.

Description of the Related Art

Portable electronic devices are gradually becoming lighter, smaller, and thinner, but their functionality are also restricted. Therefore, the prior art provides a docking station that primarily includes connectors, circuit boards, or other electronic components, such as memory units and power sources. A user can connect his portable electronic device to a docking station to improve its functionality and extensibility.

However, traditional docking stations are neither waterproof nor shockproof. Thus, water may enter the main body of the docking station, under conditions of improper use, and damage the electronic components therein. Moreover, a shock or impact may cause the electrical connection between the portable electronic device and the connector of the docking station to intermittent. Consequently, the reliability of the docking station is reduced. What is needed, therefore, is a docking station for a portable electronic device which can overcome the problems described above.

BRIEF SUMMARY OF THE INVENTION

An embodiment of the invention provides a docking station suitable for connecting to a portable electronic device. The docking station includes a main body, a connector, a cover, and an elastic sealing member. The connector is movably disposed in the main body for connecting the portable electronic device. The cover is detachably connected to the main body and has an opening for exposing the connector. The elastic sealing member is fit on the connector and abuts a side wall of the opening for preventing water from entering the main body.

In another embodiment, the connector is movable in the main body along a horizontal direction, perpendicular to the side wall of the opening.

In another embodiment, the connector is fixed to a positioning base which forms at least one positioning hole, and at least one positioning pillar extended along a vertical direction is disposed in the main body to correspond to the positioning hole.

In another embodiment, the elastic sealing member has a second side wall and at least one protrusion, wherein the protrusion surrounds the second side wall and abuts the side wall of the opening.

In another embodiment, the docking station further includes a flexible circuit board fixed to a supporting board, wherein the supporting board is disposed in a groove of the main body, and the flexible circuit board is connected to the connector.

In another embodiment, the docking station further includes a trigger switch connected to the flexible circuit board, wherein the main body has a button thereon for triggering the trigger switch, and an elastic cushion is disposed between the button and the trigger switch for absorbing a force from the button impacting the trigger switch.

In another embodiment, the docking station further includes a latch unit disposed in the main body, wherein the latch unit includes at least one hook, and the cover further has a second opening for exposing the hook, so that the hook clamps the portable electronic device for preventing the portable electronic device from becoming separated from the docking station.

In another embodiment, the latch unit further includes a bracket and at least one torsion spring, wherein the bracket is fixed in the main body, the hook is pivotally connected to the bracket, and the torsion spring is pivotally connected to the bracket and abuts the hook for making the hook stay in a fixed position.

In another embodiment, the main body has a release button for driving the hook to leave the fixed position, so that the hook releases the portable electronic device and the portable electronic device can be separated from the docking station.

In another embodiment, the release button has a hole, and the hook has a connecting part passing through the hole, so that the hook is coupled to the release button.

In order to illustrate the purposes, features and advantages of the invention, the preferred embodiments and figures of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The preferred embodiments of the invention are illustrated in the following description with references to the drawings.

Figure 1:
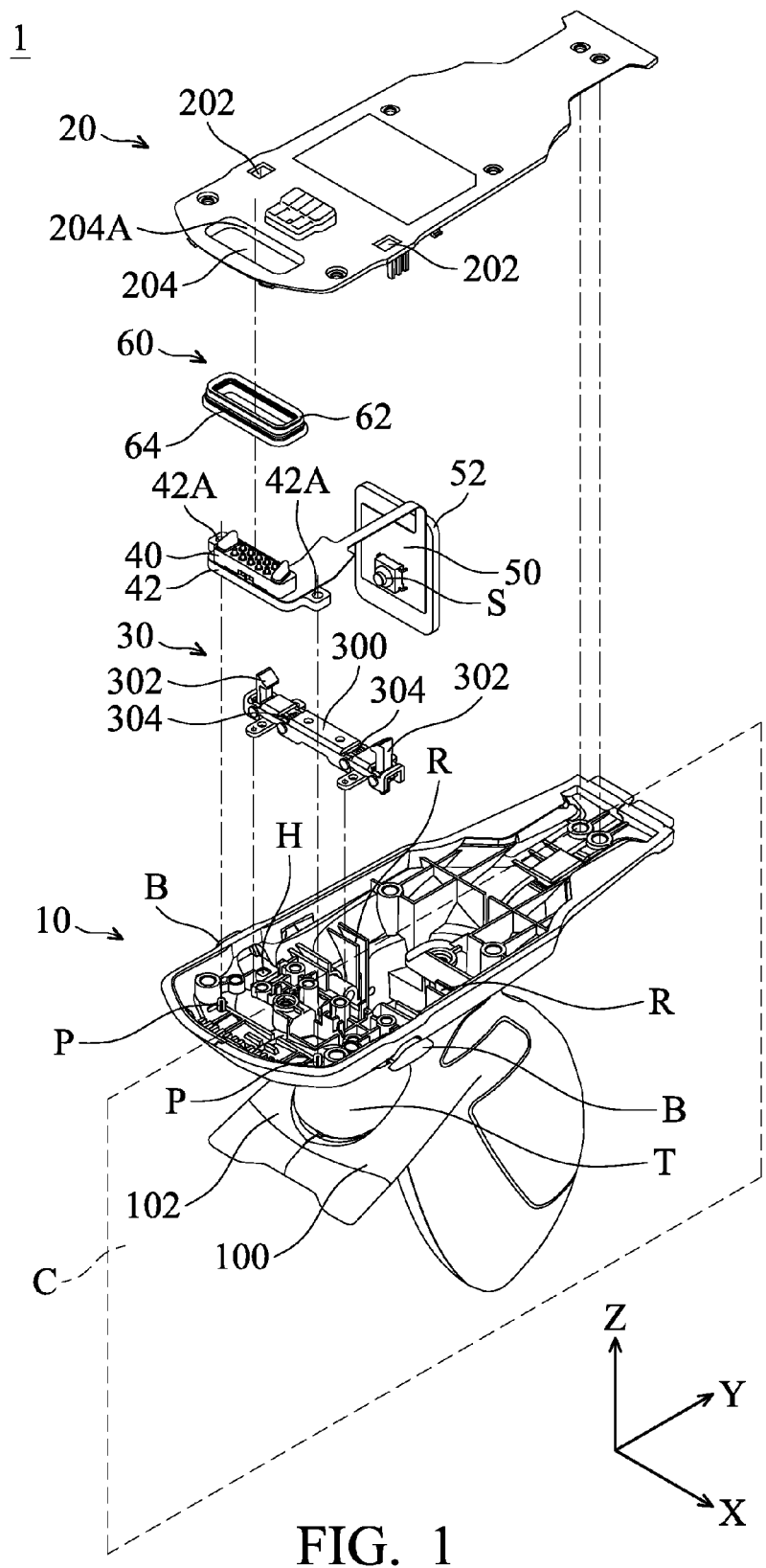
FIG. 1 is an exploded view of a docking station in accordance with an embodiment of the invention.
Figure 2:
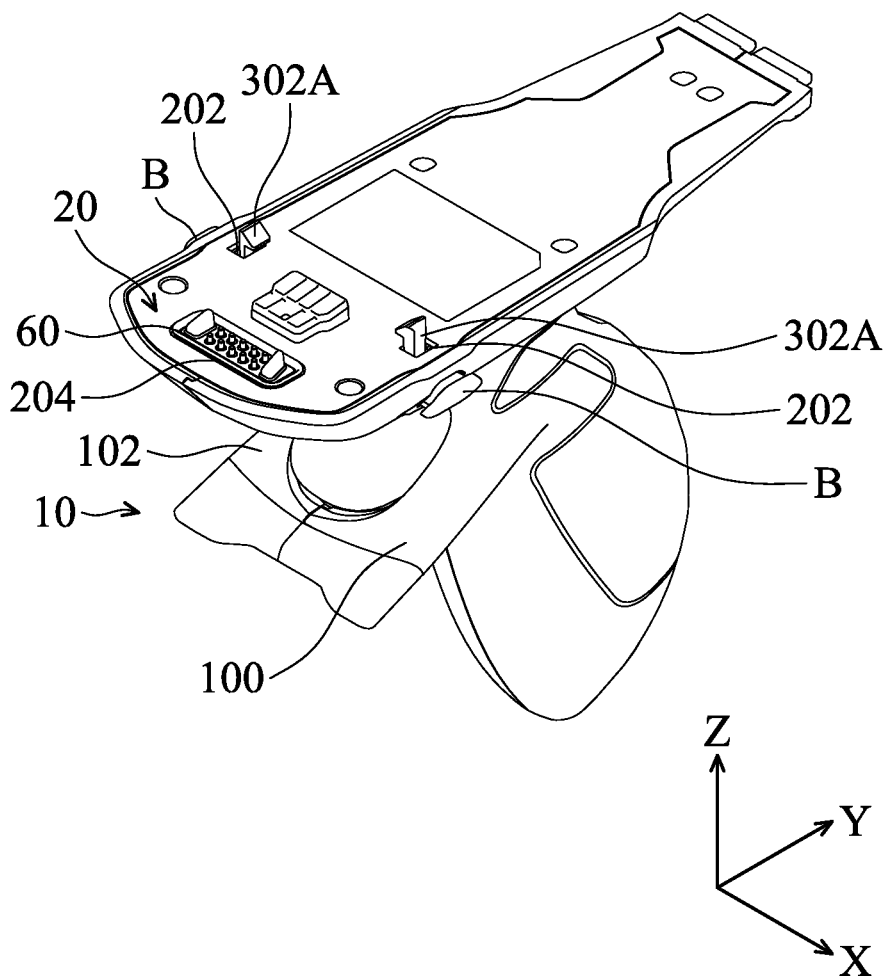
FIG. 2 is a schematic view of the docking station of FIG. 1 after assembly.

Referring to FIG. 1 and FIG. 2, a docking station 1 in accordance with an embodiment of the invention primarily includes a main body 10, a cover 20, a latch unit 30, a connector 40, a flexible circuit board (FPC) 50, and an elastic sealing member 60. It should be noted that the docking station 1 is suitable for being detachably connected to a portable electronic device 2 (FIGS. 5 and 6), such as a card reader (not shown), and signal transmission can occur between the docking station 1 and the portable electronic device 2 via the connector 40.

Figure 3:
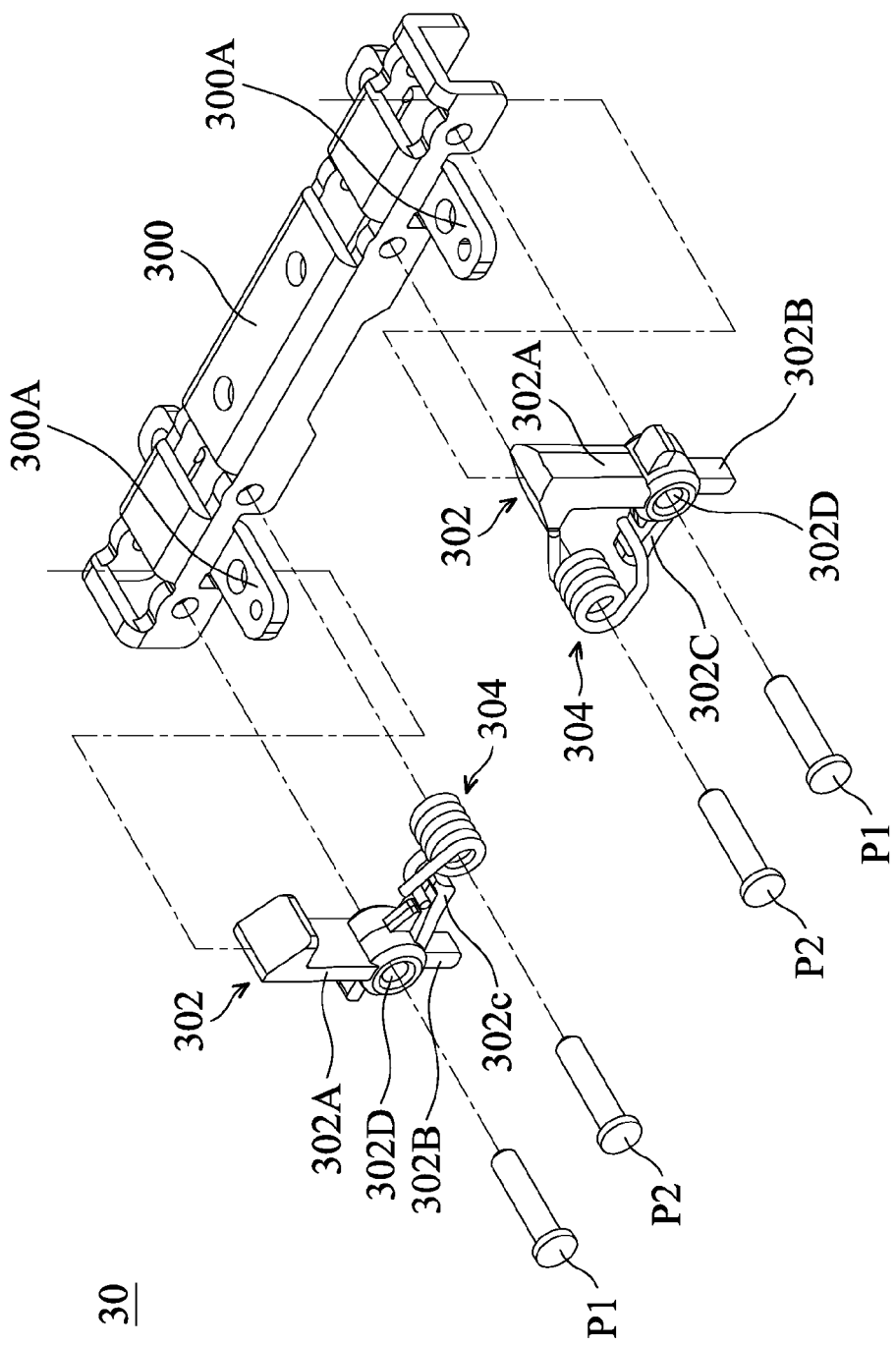
FIG. 3 is an exploded view of the latch unit in FIG. 1.

Referring to FIG. 3, the latch unit 30 includes a bracket 300 with two hooks 302 and two torsion springs 304 received therein. The bracket 300 is an elongated structure. Each of the hooks 302 has an engaging part 302A, a first connecting part 302B, a second connecting part 302C, and a pivoting part 302D. As shown in FIG. 3, the engaging part 302A and the first connecting part 302B are extended in opposite directions (the Z-axis and the −Z-axis). The second connecting part 302C is substantially perpendicular to the engaging part 302A and the first connecting part 302B and is extended toward the torsion springs 304 (the X-axis or the −X-axis). The pivoting part 302D is a through hole extended along the Y-axis and is connected between the engaging part 302A, the first connecting part 302B, and the second connecting part 302C. Each of the hooks 302 is pivotally connected to the bracket 300 via a Pin P1 passing through the pivoting part 302D, and each of the torsion springs 304 is pivotally connected to the bracket 300 via a pin P2. The hooks 302 are symmetrically arranged on opposite ends of the bracket 300, and the torsion springs 304 correspond to the hooks 302.

Figure 4:
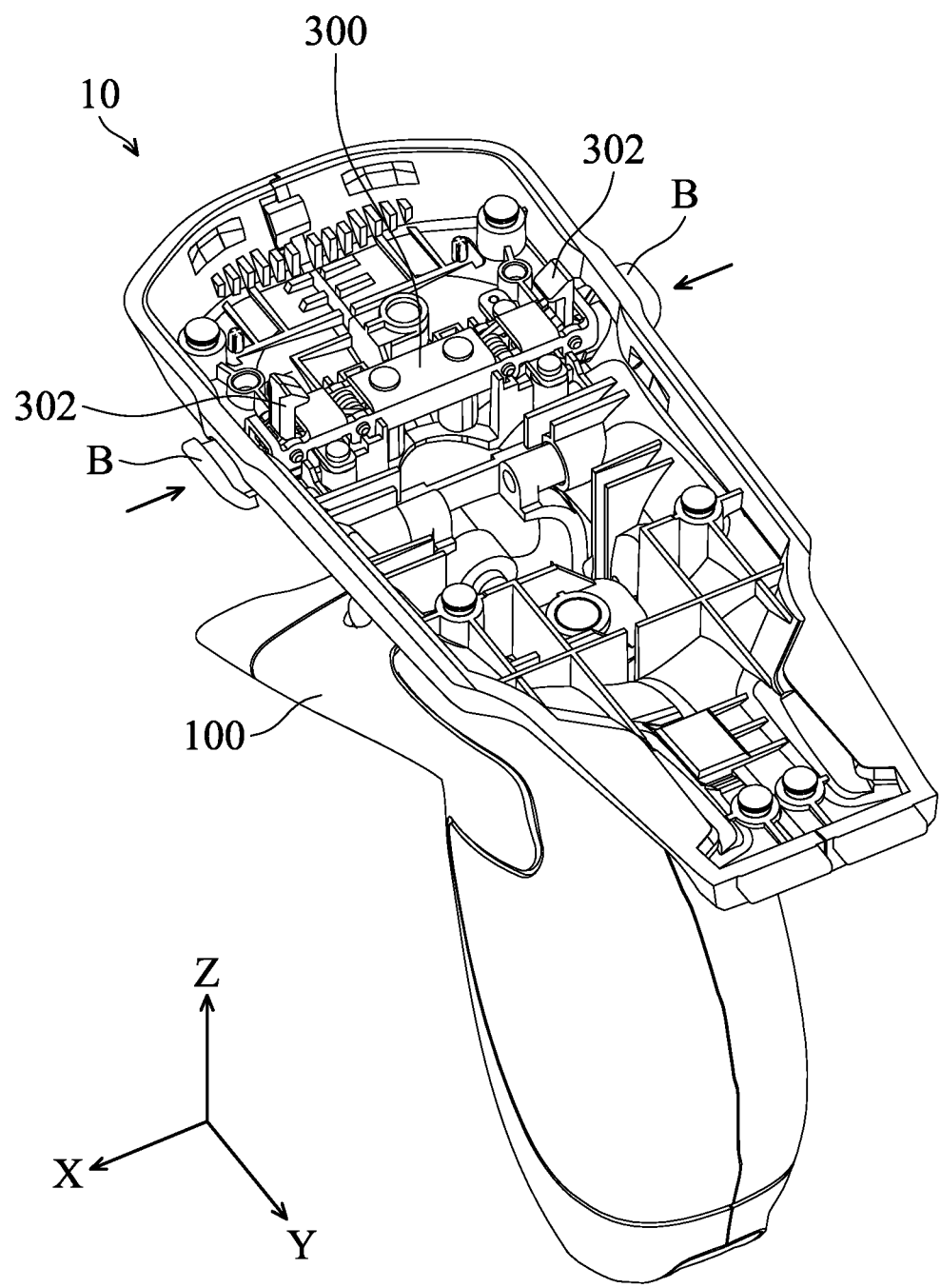
FIG. 4 is a schematic view of the latch unit and the main body in FIG. 1 after assembly.

Referring to FIG. 1 to FIG. 4, the main body 10 has a first part 100 and a second part 102 symmetrical to a reference plane C (parallel to the Y-Z plane as shown in the drawings), and the first part 100 and the second part 102 each have a release button B. The bracket 300 of the latch unit 30 further has a plurality of fixed parts 300A (FIG. 3) and is fixed in the main body 10 via a plurality of fastening members (such as rivets) passing through the fixed parts 300A (FIG. 4). The long axis of the bracket 300 is parallel to the X-axis as shown in the drawings. Moreover, the first connecting parts 302B (FIG. 3) of the hooks 302 correspondingly pass through the holes H (FIG. 1) formed on the release buttons B, so that the hooks 302 are coupled to the release buttons B. Accordingly, when the release buttons B are pushed by an external force to move toward the X-axis (direction) and the −X-axis (direction), respectively (as the arrows indicate in FIG. 4), they can drive the hooks 302 to rotate relative to the bracket 300. The cover 20 has two openings 202 (the second opening). When the cover 20 and main body 10 are assembled together, the engaging parts 302A of the hooks 302 correspondingly pass through the openings 202 to be exposed to outside of the cover 20 (FIG. 2).

Figure 5:
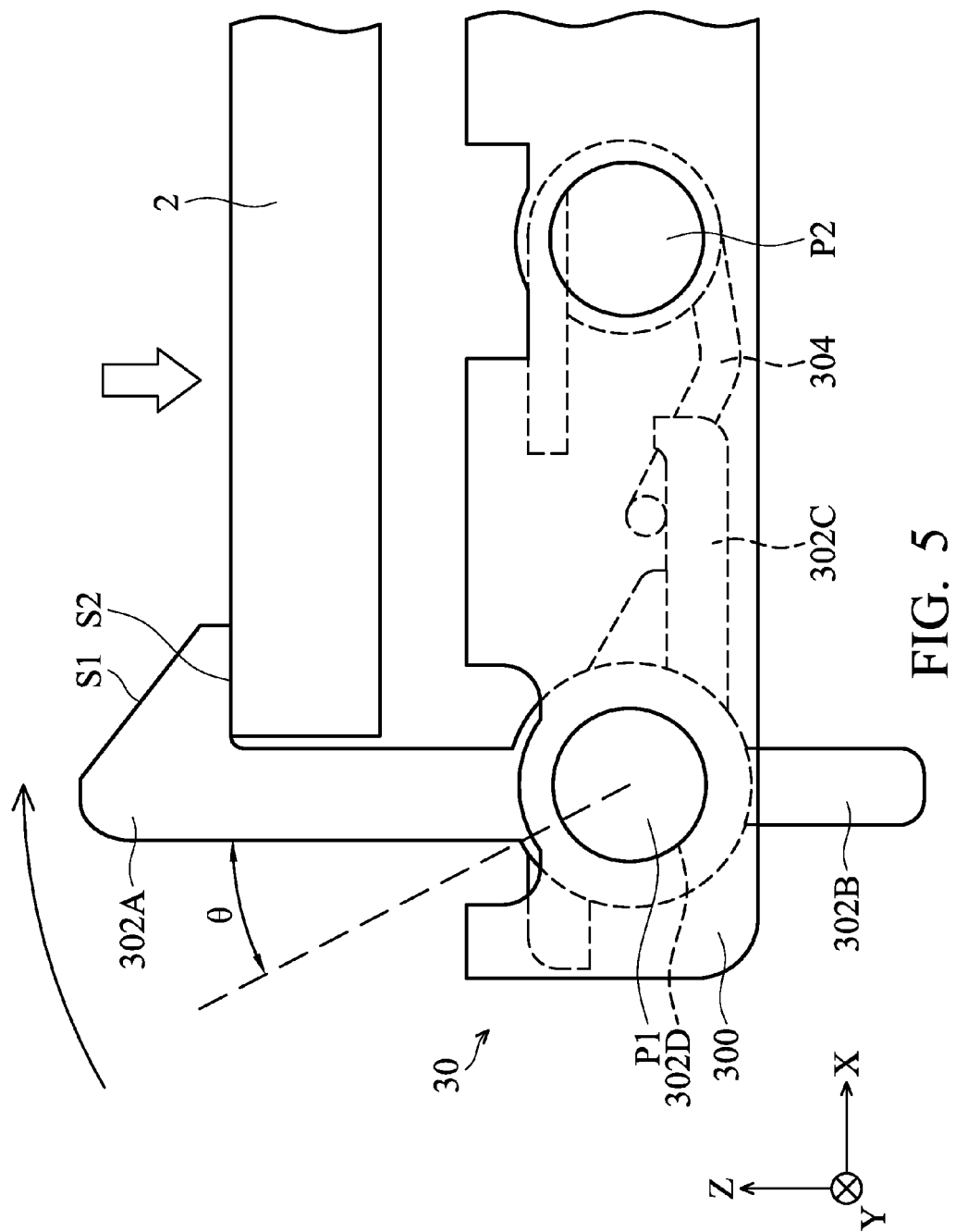
FIG. 5 is a schematic view showing how the latch unit clamps to a portable electronic device.

Referring to FIG. 5, in the latch unit 30, one end of the torsion spring 304 abuts the second connecting part 302C of the hook 302, so that the hook 302 stays in a fixed position as shown in drawing. Moreover, in FIG. 5, the end of the second connecting part 302C forms a protrusion, thus preventing the end of the torsion spring 304 from becoming separated from the second connecting part 302C. In this embodiment, when a user intends to press a portable electronic device 2 toward the docking station from the −Z-axis (direction) as shown in FIG. 5, the portable electronic device 2 will first abut an inclined surface S1 of the engaging part 302A of the hook 302. Therefore, the horizontal component of the force exerted by the user allows the hook 302 to rotate at an angle θ, so that the portable electronic device 2 can pass through the hook 302 and connect to the docking station (at this time, the torsion spring 304 generates a restoring force). Then, the hook 302 can return to the original fixed position (as the arrow indicates in FIG. 5) led by the restoring force of the torsion spring 304, and clamps the portable electronic device 2 for preventing it from becoming separated from the docking station. Consequently, assembly of the portable electronic device 2 and the docking station is completed.

Note that an engaging surface S2 of the engaging part 302A of the hook 302 abuts the portable electronic device 2 (FIG. 5) so as to generate a greater clamping force for preventing the portable electronic device 2 from easily becoming separated from the docking station. Moreover, the clamping force of the hook 302 can also be determined by the elastic force of the torsion spring 304.

Figure 6:
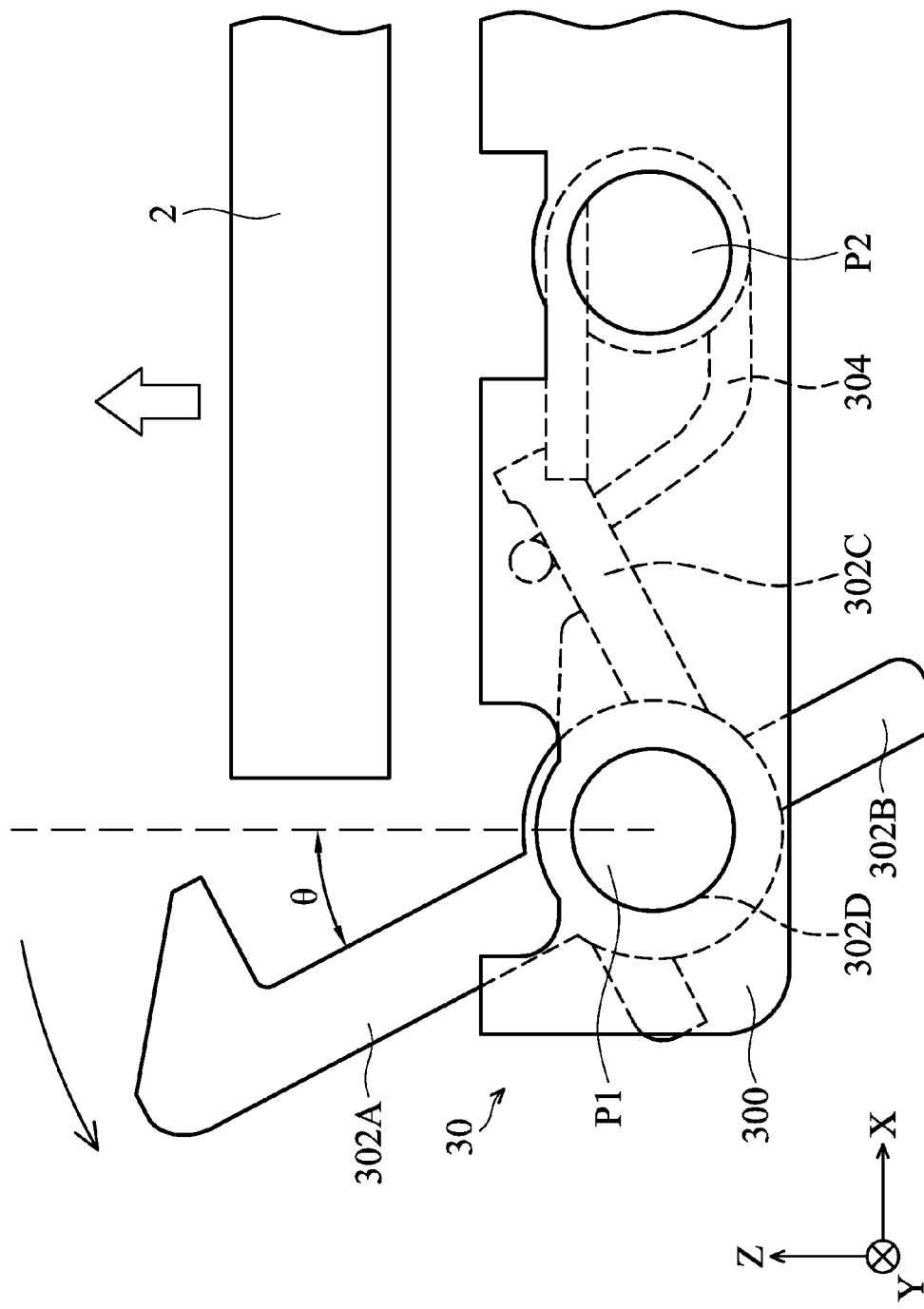
FIG. 6 is a schematic view showing how the latch unit releases the portable electronic device.

Referring to FIG. 4 and FIG. 6, when the user intends to upwardly separate the portable electronic device 2 from the docking station (not shown), he can press the two release buttons B on the main body 10. At this time, the release buttons B can move respectively along the X-axis and the −X-axis as shown in the drawings to push the first connecting parts 302B of the two hooks 302, thus driving the hooks 302 to rotate at an angle θ (as the arrow indicates in FIG. 6). Subsequently, the hooks 302 release the portable electronic device 2 and the user can separate the portable electronic device 2 from the docking station.

Although the latch unit 30 in the aforementioned embodiments includes two hooks 302 and two torsion springs 304, it may also include one hook 302 and one torsion spring 304, depending on actual requirements.

Figure 7:
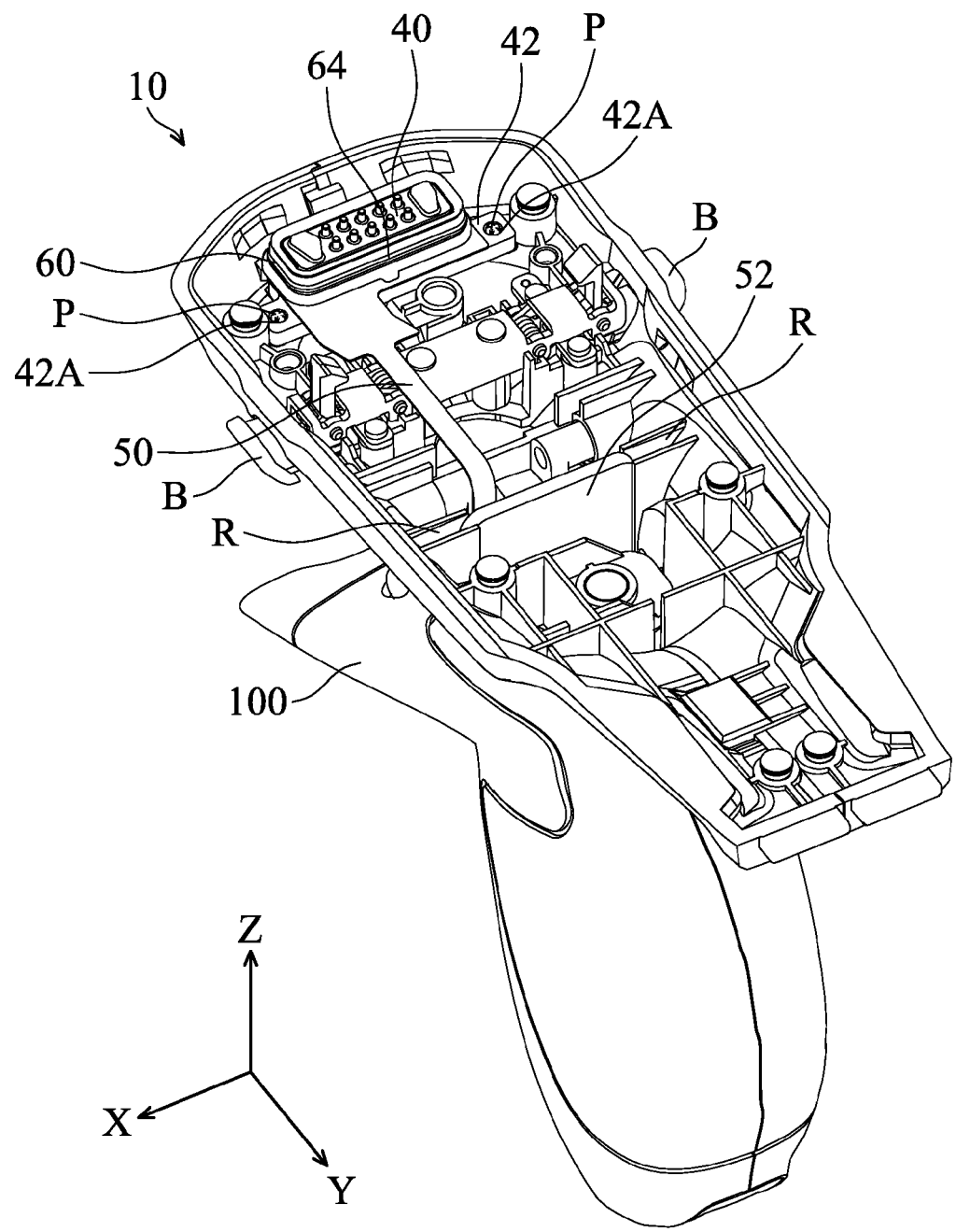
FIG. 7 is a schematic view of the connector, the flexible circuit board, the elastic sealing member, and the main body in FIG. 1 after assembly.

Referring to FIG. 1 and FIG. 7, the connector 40 is connected to a part of the flexible circuit board 50, and is fixed to a positioning base 42 which forms two positioning holes 42A respectively corresponding to two positioning pillars P (extended along the vertical direction (the Z-axis) as shown in the drawings) in the main body 10. Moreover, another part of the flexible circuit board 50 away from the connector 40 is fixed to a supporting board 52 and provided with a trigger switch S. In this embodiment, the main body 10 further forms at least one groove R (for example, two grooves R) therein, wherein the two grooves R are extended along the Z-axis as shown in the drawings, and the supporting board 52 can be disposed in the grooves R (FIG. 7 and FIG. 8), so that the flexible circuit board 50 is fixed in the main body 10. By coupling the two positioning holes 42A of the positioning base 42 with the two positioning pillars P in the main body 10, the connector 40 can be positioned in the main body 10 (FIG. 1 and FIG. 7). In some embodiments, the positioning base 42 may also form one positioning hole 42A to correspond to one positioning pillar P in the main body 10.

It should be appreciated that the positioning holes 42A and the positioning pillars P have a tolerance therebetween in this embodiment (FIG. 1 and FIG. 7). Therefore, the connector 40 can move in the main body 10 along the horizontal directions (such as the X-axis and the Y-axis shown in the drawings) to an appropriate degree. Moreover, the connector 40 is connected to the flexible circuit board 50 which is deformable, so that the connector 40 does not separate from the flexible circuit board 50 easily when it moves in the main body 10.

Referring to FIG. 1, FIG. 2, and FIG. 7, the elastic sealing member 60, such as a rubber ring, is fit on the connector 40. The cover 20 is connected to the main body 10 via a plurality of fastening members (such as rivets) for shielding the components in the main body 10. The cover 20 further has an opening 204 (the first opening) which corresponds to the connector 40. When the cover 20 is assembled with the main body 10, the connector 40 passes through the opening 204 to be exposed to outside of the cover 20 and connected with the portable electronic device 2 (FIGS. 5 and 6). Moreover, when the cover 20 is assembled with the main body 10, the elastic sealing member 60 abuts a side wall 204A (FIG. 1) of the opening 204, wherein the side wall 204A is perpendicular to the X-axis and the Y-axis as shown in the drawings. It should be understood that the cover 20 can limit the connector 40 to move along the Z-axis as shown in the drawings.

Furthermore, the elastic sealing member 60 of this embodiment has an annular side wall 62 and at least one protrusion 64 (for example, two protrusions 64). The protrusions 64 surround the side wall 62 (the second side wall) and abut the side wall 204A of the opening 204. Therefore, the elastic sealing member 60 can effectively prevent water from entering the main body 10 of the docking station 1 through the gap between the connector 40 and the opening 204. Also, the elastic sealing member 60 can absorb the tolerance between the connector 40 and the opening 204, thus ensuring that the seal is both waterproof and shockproof.

Additionally, the connector 40 in this embodiment is merely positioned in the main body 10 via the positioning holes 42A of the positioning base 42 coupling with the positioning pillars P of the main body 10, rather than being fixed in the main body 10 via some fasteners such as screws. Therefore, the connector 40 can move slightly in the main body 10 along horizontal directions (such as the X-axis and the Y-axis shown in the drawings) with the motion of the portable electronic device 2, thus preventing the electrical connection between the portable electronic device 2 and the connector of the docking station from becoming intermittent due to shock or impact. Moreover, the elastic sealing member 60 can also prevent the connector 40 from directly impacting the side wall 204A of the opening 204 when the connector 40 moves in the main body 10. Consequently, the reliability of the docking station 1 can be effectively increased.

Figure 8:
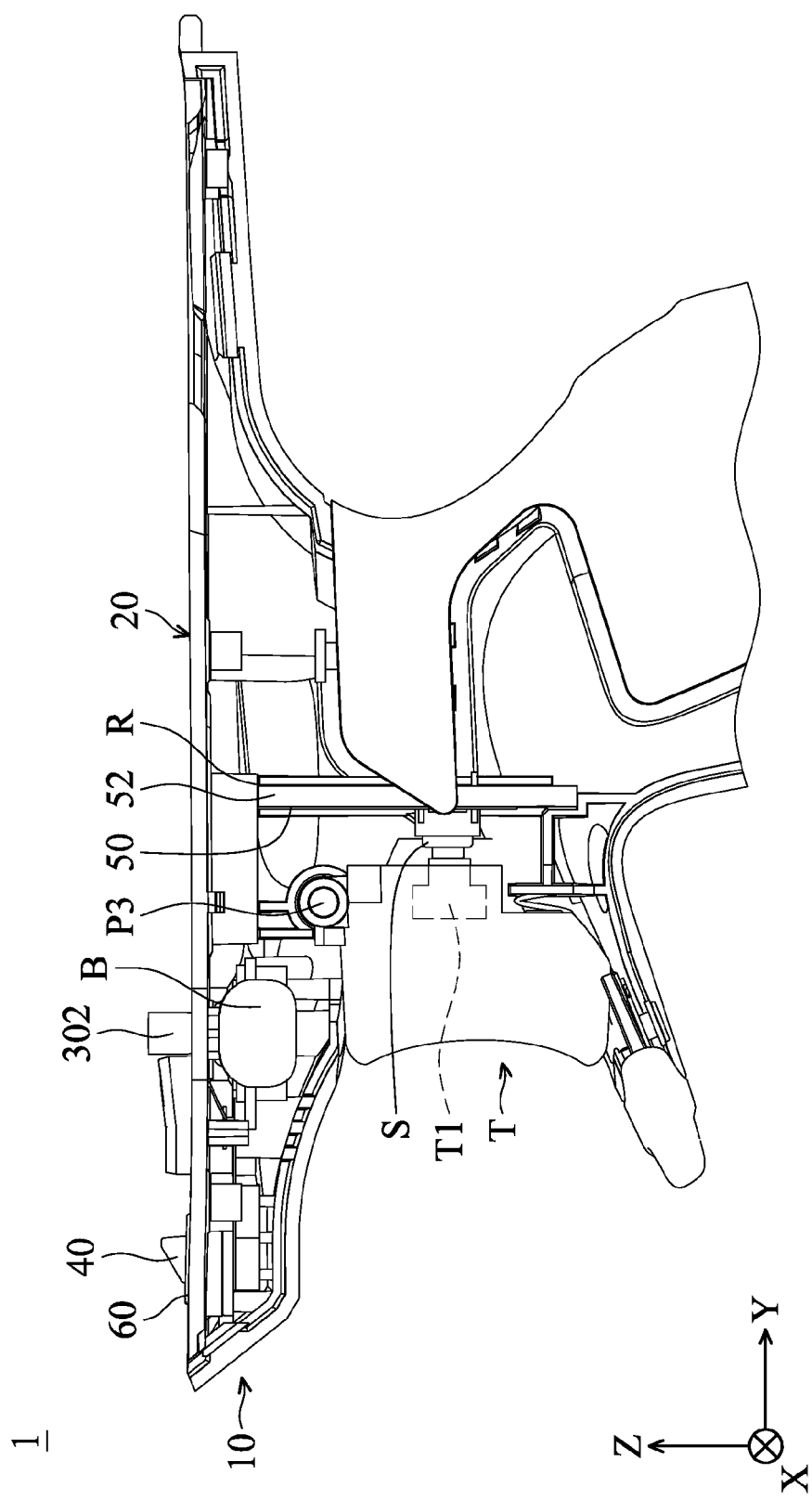
FIG. 8 is a schematic view showing that an elastic cushion is disposed between a button on the main body and a trigger switch.

Referring to FIG. 1 and FIG. 8, a button T is disposed on the main body 10 and between the first part 100 and the second part 102. The position of the button T corresponds to the trigger switch S on the flexible circuit board 50. As shown in FIG. 8, the button T is pivotally connected to the main body 10 via a pin P3. When the user presses the button T, it can trigger the trigger switch S to permit signal transmission between the docking station 1 and the portable electronic device 2 (FIGS. 5 and 6) via the connector 40.

In this embodiment, an elastic cushion T1, such as a rubber sleeve, is further disposed between the button T and the trigger switch S for absorbing the force from the button T impacting the trigger switch S, so as to prevent damage to the trigger switch S.

Figure 9:
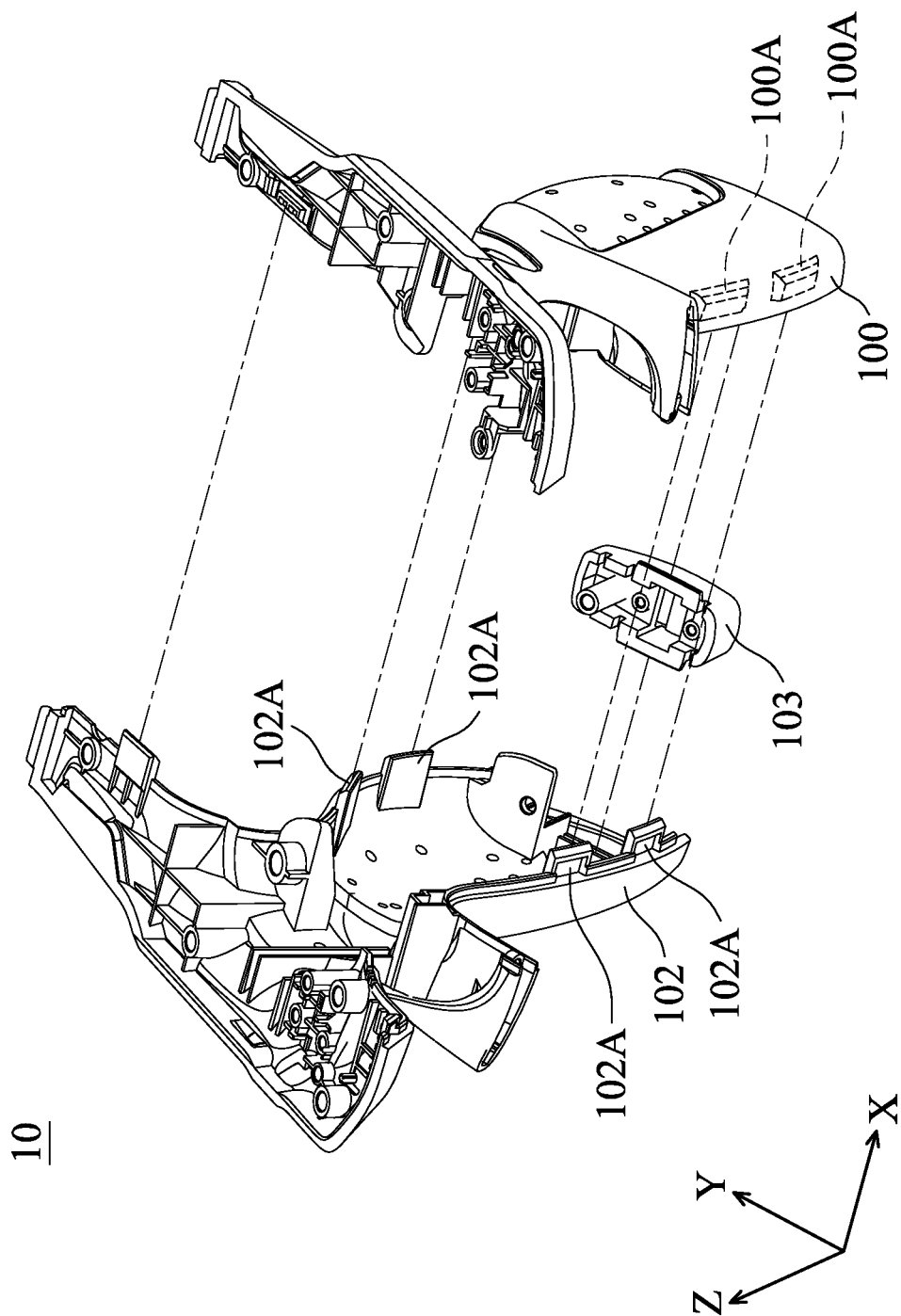
FIG. 9 is an exploded view of the main body in FIG. 1.

Referring to FIG. 9, the peripheries of the first part 100 and the second part 102 of the main body 10 respectively have at least one first fastening part 100A and at least one second fastening part 102A formed thereon, wherein the first fastening parts 100A correspond to the second fastening parts 102A. Therefore, the first and second parts 100 and 102 can be combined with each other via the first and second fastening parts 100A and 102A without using any screw shown on the appearance of the main body 10. Furthermore, in order to increase the structural strength of the main body 10 and improve its holding feeling, a steel piece 103 is also disposed in the main body 10. In this embodiment, the steel piece 103 can be fixed to the bottom of the main body 10 via a fastener (such as a screw, not shown in FIG. 9) passing through the first and second parts 100 and 102.

As described above, the invention provides a docking station suitable for connecting to a portable electronic device, including a main body, a connector, a cover, and an elastic sealing member. The connector is movably disposed in the main body for connecting the portable electronic device. The cover is detachably connected to the main body and has an opening for exposing the connector. The elastic sealing member is fit on the connector and abuts a side wall of the opening for preventing water from entering the main body. With the above structural design, the invention can achieve a waterproof and shockproof docking station and effectively increase the reliability thereof.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A docking station suitable for being connected to a portable electronic device, comprising:
    a main body, wherein the main body has a release button having a hole;
    a connector movably disposed in the main body for connecting the portable electronic device;
    a cover detachably connected to the main body and having an opening for exposing the connector;
    an elastic sealing member fit on the connector and abutting a side wall of the opening for preventing water from entering the main body; and
    a latch unit, disposed in the main body and having at least one hook, wherein the at least one hook has a connecting part passing through the hole, so that the at least one hook is coupled to the release button, wherein the connector is movable in the main body along a horizontal direction, perpendicular to the side wall of the opening and parallel to a surface of the cover formed with the opening.

2. The docking station as claimed in claim 1, wherein the connector is fixed to a positioning base which forms at least one positioning hole, and at least one positioning pillar extended along a vertical direction is disposed in the main body to correspond to the positioning hole.

3. The docking station as claimed in claim 1, wherein the elastic sealing member has a second side wall and at least one protrusion, and the protrusion surrounds the second side wall and abuts the side wall of the opening.

4. The docking station as claimed in claim 1, further comprising a flexible circuit board fixed to a supporting board, wherein the supporting board is disposed in a groove of the main body, and the flexible circuit board is connected to the connector.

5. The docking station as claimed in claim 4, further comprising a trigger switch connected to the flexible circuit board, the main body having a button thereon for triggering the trigger switch, and an elastic cushion is disposed between the button and the trigger switch for absorbing a force from the button impacting the trigger switch.

6. The docking station as claimed in claim 1, wherein the cover further has a second opening for exposing the at least one hook, so that the at least one hook clamps the portable electronic device for preventing the portable electronic device from becoming separated from the docking station.

7. The docking station as claimed in claim 6, wherein the latch unit further includes a bracket and at least one torsion spring, the bracket fixed in the main body, the at least one hook pivotally connected to the bracket, and the torsion spring is pivotally connected to the bracket and abuts the at least one hook for making the at least one hook stay in a fixed position.

8. The docking station as claimed in claim 7, wherein the at least one hook can be driven by the release button to leave the fixed position, so that the at least one hook releases the portable electronic device and the portable electronic device can be separated from the docking station.

* * * * *